(12) United States Patent
Callas et al.

(10) Patent No.: US 6,883,314 B2
(45) Date of Patent: Apr. 26, 2005

(54) COOLING OF ENGINE COMBUSTION AIR

(75) Inventors: James J. Callas, Peoria, IL (US); Gerald N. Coleman, Dunlap, IL (US); James J. Faletti, Spring Valley, IL (US); David A. Pierpont, Peoria, IL (US); James R. Weber, Lacon, IL (US)

(73) Assignee: Caterpillar Inc., Peoria, IL (US)

( * ) Notice: Subject to any disclaimer, the term of this patent is extended or adjusted under 35 U.S.C. 154(b) by 123 days.

(21) Appl. No.: 10/210,273

(22) Filed: Aug. 1, 2002

(65) Prior Publication Data

US 2004/0020204 A1 Feb. 5, 2004

(51) Int. Cl.[7] ............................. F02B 29/04; F02B 33/44
(52) U.S. Cl. ........................ 60/599; 60/612; 123/563; 165/173; 165/177
(58) Field of Search .................. 60/612, 599; 123/563, 123/316; 165/173, 177

(56) References Cited

U.S. PATENT DOCUMENTS

| | | | | | |
|---|---|---|---|---|---|
| 3,941,104 A | * | 3/1976 | Egli | ............................. | 60/612 |
| 3,977,195 A | * | 8/1976 | Treuil | ........................... | 60/599 |
| 4,232,641 A | * | 11/1980 | Curtil | .......................... | 123/316 |
| 4,236,492 A | * | 12/1980 | Tholen | ......................... | 123/563 |
| 4,317,439 A | * | 3/1982 | Emmerling | ................... | 123/563 |
| 4,385,594 A | * | 5/1983 | Hauser, Jr. | .................... | 123/563 |
| 5,036,668 A | * | 8/1991 | Hardy | ........................... | 60/599 |
| 5,730,213 A | * | 3/1998 | Kiser et al. | ................... | 165/148 |
| 5,845,705 A | * | 12/1998 | Vinh et al. | ................... | 165/173 |
| 6,158,399 A | * | 12/2000 | Ash et al. | ..................... | 123/563 |
| 6,651,618 B1 | * | 11/2003 | Coleman et al. | ............ | 123/316 |
| 2003/0033993 A1 | * | 2/2003 | Valaszkai et al. | ............. | 60/599 |

FOREIGN PATENT DOCUMENTS

| | | | | |
|---|---|---|---|---|
| JP | 2000-220480 | | 8/2000 | |
| JP | 2001193468 A | * | 7/2001 | ........... F02B/29/08 |
| SE | 200102295 A | * | 12/2002 | ........... F02B/29/04 |

* cited by examiner

Primary Examiner—Thai-Ba Trieu
(74) Attorney, Agent, or Firm—Larry G. Cain; Keith P Roberson

(57) ABSTRACT

Combustion air for use in an engine is normally compressed by a compressor which adds heat during the process of increasing the density of the combustion air. To decrease the heat content of the combustion air, an aftercooler is used. When compressing combustion air to a higher density, the combustion air is compressed by a first compressor section to a first preestablished pressure and temperature and by a second compressor section to a second preestablished pressure and temperature. To decrease the heat content of the highly compressed dense combustion air, a first aftercooler having an air to liquid configuration is used and a second aftercooler having an air to air configuration is used.

49 Claims, 5 Drawing Sheets

COOLING OF ENGINE COMBUSTION AIR

TECHNICAL FIELD

This disclosure relates generally to cooling of combustion air for use in an engine and more particularly to a method and apparatus for cooling combustion air with a jacket water aftercooler and an air to air aftercooler.

BACKGROUND

As the quest for improved engine efficiency is sought, the supply of intake air becomes more critical. The quantity of intake air can be increased by compressing the air to a higher density. With the increased pressure of the intake air, the intake air is heated to a higher temperature which can further add to the emissions emitted from such engines. With the requirement for greater cooling, the operation of the engine, operating components and accessories can be compromised. Thus, the engine, operating components and accessories may fail prematurely. To overcome the increased temperature, systems have been sought to reduce the temperature of the intake air. One such system is disclosed in Japanese Patent Number JP20002200480 published Aug. 8, 2000 being invented by Hiroshi Fujimoto et. al. In the disclosure an engine uses a Miller cycle to improve the combustion efficiency and improve fuel consumption. A first supercharger compresses the intake air and the compressed intake air is passed through a first cooler. From the first cooler the intake air is further compressed by a second supercharger and passed through a second cooler prior to being introduced into a combustion chamber of a cylinder of the engine. The disclosure further discloses an Exhaust Gas Recirculation (EGR) means for use with the Miller cycle, series supercharged series cooled intake air engine.

The present disclosure is directed to overcoming one or more of the problems as set forth above.

SUMMARY OF THE INVENTION

In one aspect a combustion air cooling system for use with an engine is disclosed. The engine has an exhaust manifold, an intake manifold and at least one cylinder bore having a piston assembly therein being movable between a top dead center position (TDC) and a bottom dead center position (BDG). At least one intake valve mechanism being movable between an open position and a closed position during operation of the engine is provided. And, a flow of combustion air being communicated between the intake manifold and the at least one cylinder bore during the open position and the flow of combustion air being prevented from communicating between the intake manifold and the at least one cylinder bore during the closed position is provided. The combustion air cooling system comprises an engine cooling system including a heat exchanger being of a liquid-to-air type heat exchanger configuration and a liquid coolant pump. The liquid coolant pump is attached to the engine and has a coolant pump outlet portion and a coolant pump inlet portion. The heat exchanger has a liquid coolant inlet and a liquid coolant outlet. The liquid coolant pump, during operation of the engine, causes a first flow of liquid to circulate between the engine and the heat exchanger. The engine cooling system has a flow of recipient fluid being an atmospheric air passing therethrough. A first turbocharger is positioned on the engine. The first turbocharge has a turbine section and during operation of the engine the turbine section being driven by a flow of exhaust gas exiting a second turbocharger, a compressor section being driven by the turbine section. The compressor section has an inlet portion and an outlet portion. The combustion air after passing from the inlet portion through the outlet portion has a first preestablished pressure. The second turbocharger is position on the engine. The second turbocharger has a turbine section and during operation of the engine the turbine section being driven by the flow of exhaust gas exiting said exhaust manifold. A compressor section is driven by the turbine section, has an inlet portion and an outlet portion. The combustion air after passing through the outlet portion of the first turbocharger entering the inlet portion of the second turbocharger and passes through the outlet portion and has a second preestablished pressure being greater than the first preestablished pressure exiting the first turbocharger. A first aftercooler is of an air-to-liquid type heat exchanger configuration and has a recipient fluid therein. The first aftercooler has a donor portion and a recipient portion being connected to the engine. The donor portion has a combustion air inlet portion combustion air transfer portion and a combustion air outlet portion. The recipient portion has a liquid coolant inlet portion a liquid coolant transfer portion and a liquid coolant outlet portion. The first aftercooler has the liquid from the engine cooling system being the recipient fluid. The first aftercooler has the combustion air being the donor fluid and exiting the combustion air outlet portion of the first aftercooler at a first preestablished temperature. And, a second aftercooler being fan air-to-air type heat exchanger configuration and having a recipient fluid therein, having a donor portion and a recipient portion being connected to the engine. The donor portion having a combustion air inlet portion a combustion air transfer portion and a combustion air outlet portion. The recipient portion having atmospheric air inlet portion, an atmospheric air transfer portion and an atmospheric air outlet portion. The second aftercooler having the atmospheric air being the recipient fluid. The second aftercooler has the combustion air being the donor fluid and exiting the combustion air outlet portion of the second aftercooler at a second preestablished temperature being less than the first preestablished temperature. The combustion air at the second preestablished pressure and the second preestablished temperature being communicated to the intake manifold and the at least one cylinder bore.

In another aspect, a method of cooling combustion air for use with an engine is disclosed. The engine has a block at least one cylinder bore being positioned in the block and has a piston assembly operatively positioned therein. A plurality of cooling passages are position in the block, an intake manifold and an exhaust manifold are a part of the engine. The method of cooling comprises providing an engine cooling system. The engine cooling system has a heat exchanger being of a liquid-to-air type heat exchanger. Providing a first flow of liquid coolant through the heat exchanger and the engine. Compressing a flow of combustion air to a first preestablished pressure and a first preestablished temperature. Compressing the flow of combustion air to a second preestablished pressure and a second preestablished temperature. Cooling the flow of combustion air to a first temperature using a second flow of the liquid coolant through a first aftercooler having a recipient fluid being the flow of liquid coolant through the engine. And, cooling the flow of combustion air to a second temperature using a second aftercooler having a recipient fluid being an atmospheric air.

In another aspect a combustion air cooling system is used with an engine. The engine has a block including a plurality of cooling passages, at least a cylinder bore having a flow of combustion fluid and a flow of combustible fluid being supplied thereto. The combustion fluid and the combustible fluid combusting and forming an exhaust. The combustion air cooling system comprises an engine cooling system being in communication with the engine and including a heat exchanger being of a liquid-to-air type heat exchanger configuration and a liquid coolant pump. The liquid coolant pump defines a first flow of a liquid coolant. The first flow circulates through the liquid coolant pump, the plurality of cooling passages in the block and the heat exchanger. A first compressor section is attached to the engine and has an inlet portion and an outlet portion. The first compressor section compresses the combustion fluid to a first preestablished pressure and a first preestablished temperature. A second compressor section is attached to the engine and has an inlet portion and an outlet portion. The inlet portion of the second compressor section is connected to the outlet portion of the first compressor section, the second compressor section compressing the combustion fluid to a second preestablished pressure and a second preestablished temperature. A turbine section is attached to the engine and is driven by the exhaust from the at least one cylinder bore. The turbine section drives the first compressor section and the second compressor section by a shaft. A first aftercooler being of an air-to-liquid type heat exchanger configuration is attached to the engine and has the combustion fluid flowing therethrough as the air and the liquid coolant flowing therethrough the liquid. The first aftercooler has an inlet portion and an outlet portion and a liquid coolant inlet portion and a liquid coolant outlet portion. A second aftercooler being of an air-to-air type heat exchanger configuration is in communication with the engine and has the combustion fluid flowing therethrough as one of the air and has an atmospheric air flowing therethrough as an other of the air. The second aftercooler has a combustion air inlet portion being connected to the outlet portion of the first aftercooler and a combustion air outlet portion being connected to the at least one cylinder bore. And, a second flow of the liquid coolant, the liquid coolant pump defines the second flow of the liquid coolant. The second flow of the coolant circulates through at least the liquid coolant pump and the first aftercooler.

DETAILED DESCRIPTION

Figure 1:
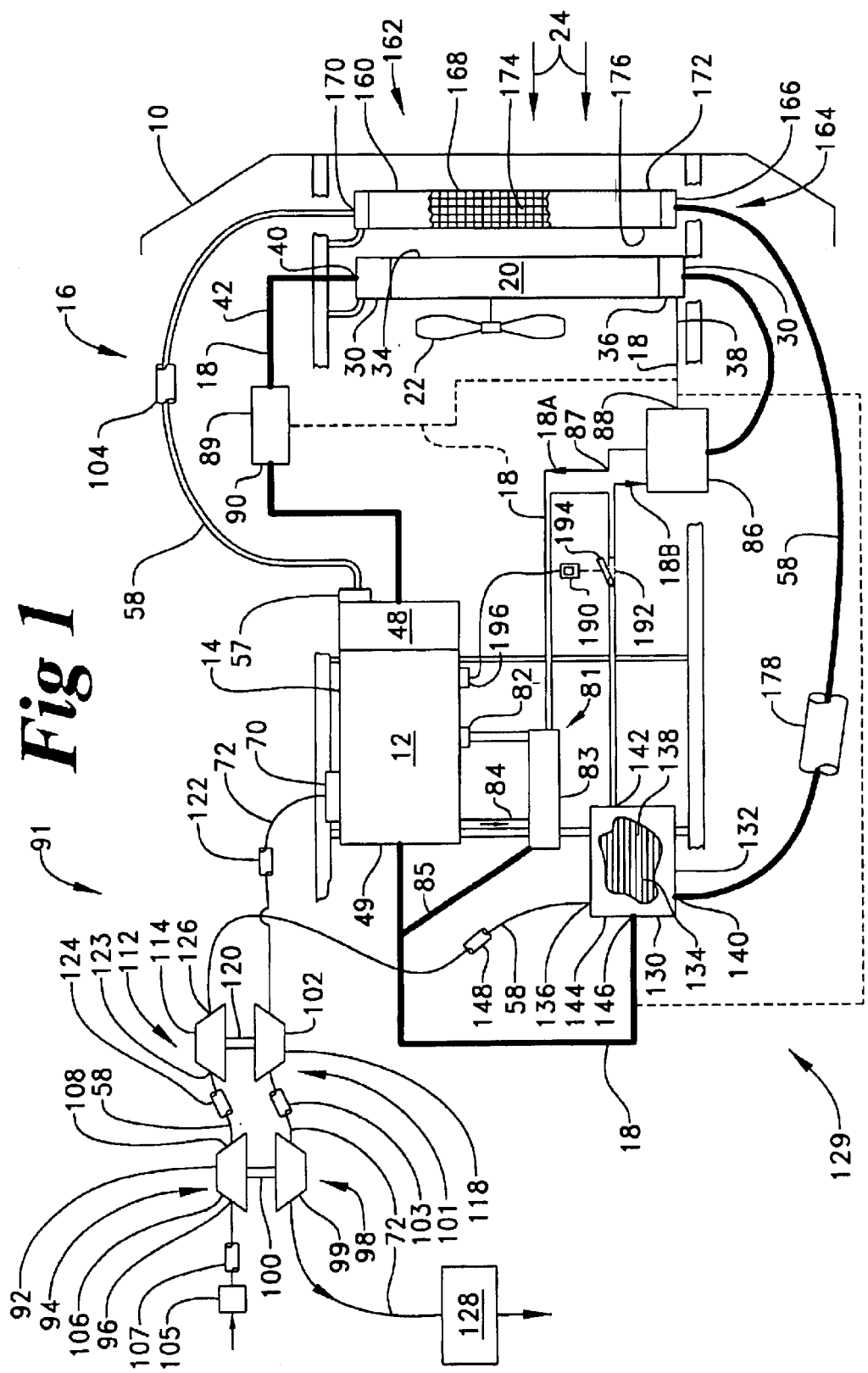
FIG. 1 is a schematic view of a combustion air cooling system and an environment in which the combustion air cooling system operates.
Figure 2:
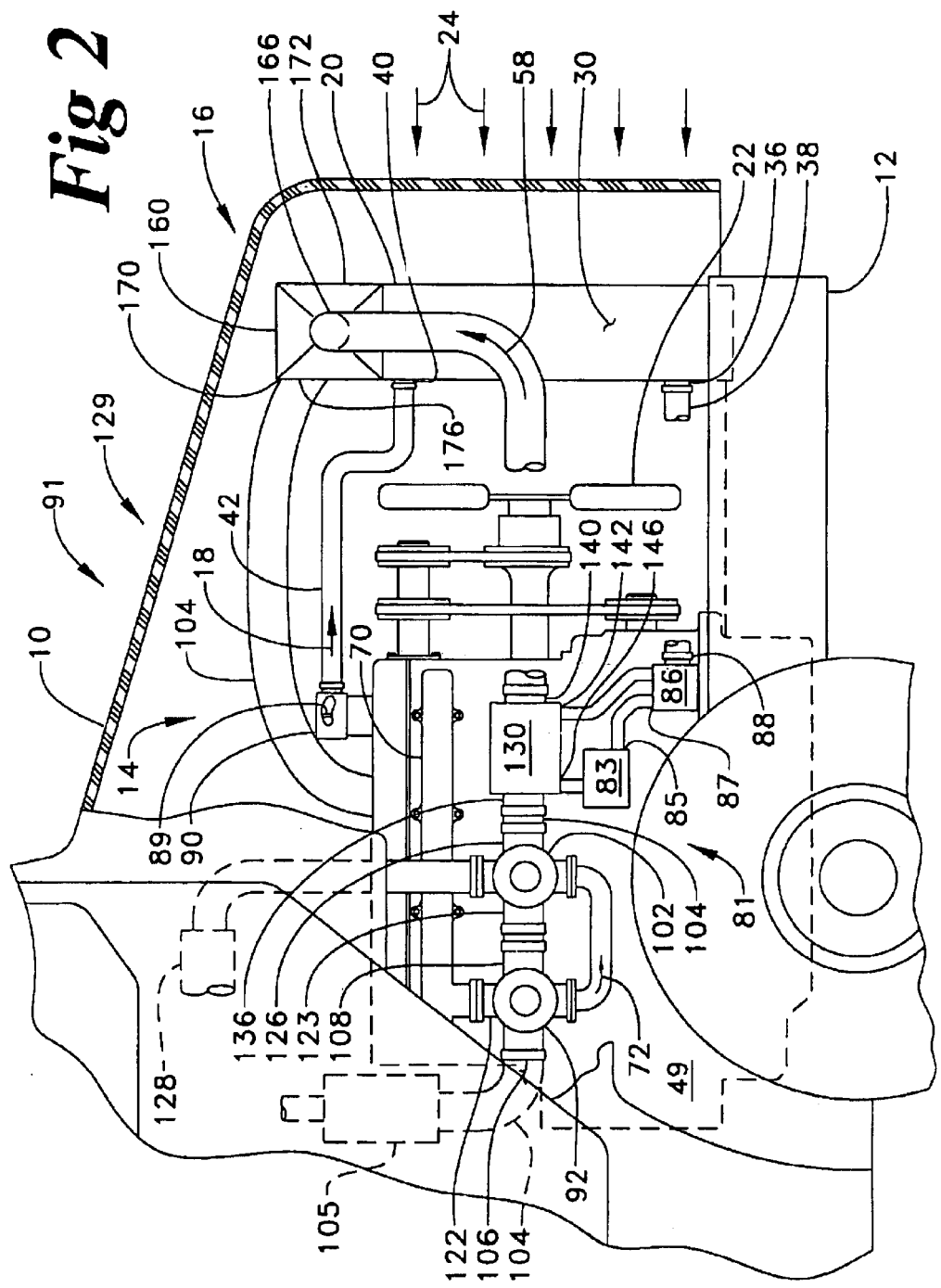
FIG. 2 is view of a combustion air cooling system and its environment.

In FIGS. 1 and 2, a work machine or a vehicle 10 is shows having a chassis 12. Examples of such work machine could be a track type loader or a motor grader. And, an example of a vehicle could be an on-highway truck such as a semi-tractor or a dump truck or a delivery truck. An engine 14 is positioned in the chassis 12. In this application, the engine 14 is of the 4-cycle configuration but as an alternative could be of another configuration such as a 2-cycle configuration. An engine cooling system 16 is positioned in the chassis 12 and communicates a liquid coolant, represented by the arrow and lines 18 between a heat exchanger or radiator 20, being of a liquid-to-air type heat exchanger configuration, and the engine 14. In this application, the coolant 18 is a liquid such as a mixture of water and antifreeze. A fan 22 is positioned in the engine cooling system 16 and operatively causes a flow of a recipient fluid, represented by the arrows 24, such as atmospheric air, to pass through the heat exchanger 20. In this application, the coolant 18 acts as a donor fluid and the atmospheric air 24 acts as the recipient fluid. The fan 22 in this application is driven by an electric motor, not shown, but as an alternative could be driven by another source such as a hydraulic motor or could be driven directly from the engine 14.

The heat exchanger 20, in this application, has a pair of side tanks 30 having a plurality of tubes and fins 34 interposed the pair of side tanks 30 in a conventional manner. As an alternative, the heat exchanger 20 could be of other designs, one such having a top tank and a bottom tank and vertical tubes and fins without changing the gest of the disclosure. A liquid coolant outlet 36 is positioned in one of the pair of side tanks 30 near a bottom and has a lower flexible hose 38 communicating between the liquid coolant inlet 36 and the engine 14 in a conventional manner. A liquid coolant inlet 40 is positioned in the other of the pair of side tanks 30 near a top and communicates with the engine 14 by way of an upper flexible hose 42 in a conventional manner.

Figure 3:
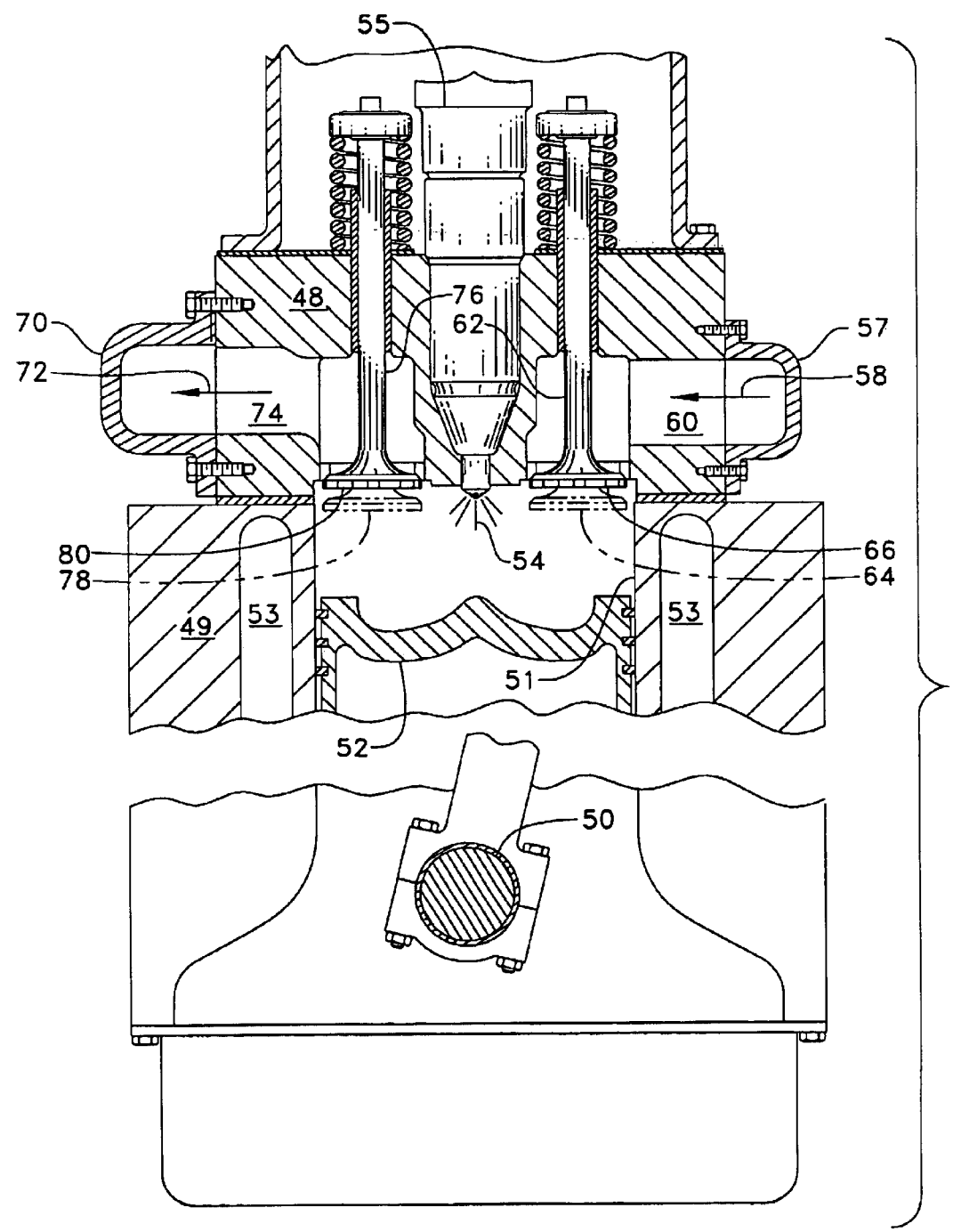
FIG. 3 is a partially cross sectioned view of an engine.
Figure 4:
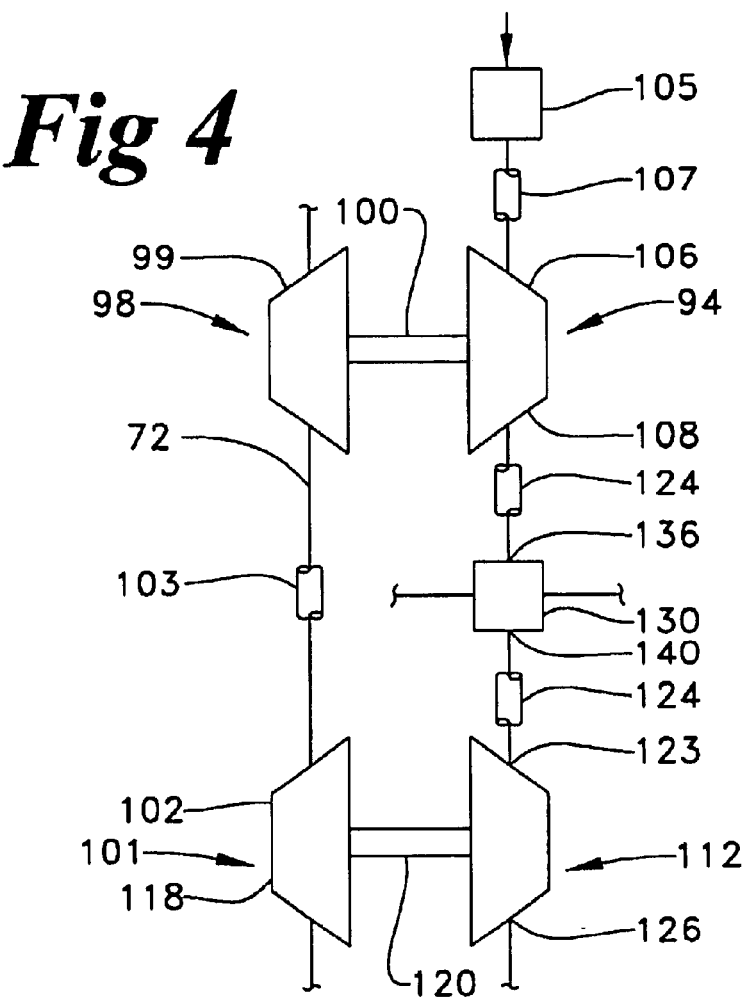
FIG. 4 is a schematic vies of an alternate combustion air cooling system and its environment.

As best shown in FIG. 3, the engine 14 has a cylinder head 48 connected to a block 49 in which is rotatably positioned a crankshaft 50 and at least a cylinder bore 51 having a piston assembly 52 therein connected to the crankshaft 50 in a conventional manner. The block 49 has a plurality of cooling passages 53 positioned therein in a conventional manner. The cylinder bore 51 may be formed in the block 49 or within a sleeve or a cylinder liner without changing the gest of the disclosure. The piston assembly 52 moves between a top dead center position, TDC, and a bottom dead center position, BDC, in a conventional manner. The 4 cycles include a rotation of the crankshaft 50 from 0 degrees to 180 degrees being an intake stroke, from 180 degrees to 360 degrees being a compression stroke, from 360 degrees to 540 degrees being a combustion stroke. The engine 14 has a flow of fuel 54 being supplied by a fuel injector 55. The engine 14 has an intake manifold 57 having a flow of compressed or pressurized combustion air, represented by the arrow and lines 58, therein, as will be explained later. The flow of pressurized combustion air 58 communicates with the cylinder bore 51 in a conventional manner such as through the head 48 having at least a passage 60 and at least an intake valve mechanism 62 positioned therein. The intake valve mechanism 62 is operated between an open position 64, shown in phantom, and a closed position 66. The engine 14 has an exhaust manifold 70 having a flow of exhaust gas, represented by the arrow and lines 72 therein. The exhaust gas 72 communicates with the cylinder bore 51 in a convention manner such as through at least a passage 74 and at least an exhaust valve mechanism 76. The exhaust valve mechanism 76 is operated between an open position 78, shown in phantom, and a closed position 80. In this application, the intake valve or valves and the exhaust valve or valves are actuated by a camshaft, not shown, of a conventional design. However, as an alternative, the intake valve or valves and the exhaust valve or valves could be operated by other means such as a hydraulically, an electrically or a combination type of actuation or actuator.

The engine 14 has a conventional lubricating system 81 including a lubricating pump 82 and an oil cooler 83 in which the coolant 18 acts as a recipient fluid and cools a lubricant, represented by the arrow and line 84. The lubricant 84 acts as a donor fluid. The oil cooler 83 has a recipient coolant outlet portion 85.

The engine cooling system 16 includes a coolant pump 86 attached to the block 49 in a conventional manner. The coolant pump 86 operatively causes a first flow, indicated by arrow 18A, of the total coolant 18 to circulate between the engine 14 and the heat exchanger 20. The coolant pump 86 has a coolant pump outlet portion 87 and a coolant pump inlet portion 88. A thermostat 89 regulates the flow of the coolant 18, during cold conditions of the coolant 18 and the engine 14, in a conventional manner. The thermostat 89 is positioned within a thermostat housing 90 in a conventional manner. The combination of the thermostat 89 and the fan 22 maintain the coolant 18 at a generally constant operating temperature. For example, in this application the operating temperature of the coolant 18 is maintained at about 90 degrees centigrade. For example, the coolant 18 at the coolant outlet 36 of the respective one of the pair of side tanks 30 has an operating temperature of about 80 degrees centigrade and the coolant 18 at the coolant inlet 40 in the other one of the pair of side tanks 30 has an operating temperature range of about 100 degrees centigrade. Thus, the heat exchanger 20 in this application has a cooling range between the coolant inlet 40 and the coolant outlet 36.

The engine 14 has a combustion air induction system 91. The combustion air induction system 91 includes a first turbocharger 92. The first turbocharger 92 has a compressor section 94 having a compressor wheel 96 therein. The first turbocharger 92 has a turbine section 98 having a turbine wheel 99 being connected to a shaft 100. The shaft 100 is connected to the compressor wheel 96 in a conventional manner. The flow of exhaust gas 72 is communicated from a turbine section 101 of a second turbocharger 102 to the turbine section 98 in a conventional manner, such as by a pipes 103. The flow of pressurized combustion air 58 is communicated between the compressor section 94 to the intake manifold 57 in a conventional manner, such as by a pipe 104. In this application, a filter 105 is interposed the atmospheric air, also represented by the arrows 24, and an inlet portion 106 of the compressor section 94. Atmospheric air 24 passes through the filter 105, through a pipe 107 and into the compressor section 94 and is compressed forming a first flow of combustion air at a first preestablished pressure ratio for use as the compressed combustion air 58. The compressed combustion air 58 exits an outlet portion 108 of the compressor section 94. In this application, a first preestablished pressure ration of the combustion air is about 3 atmospheres or in this application about 2.4 atmospheres. And, the temperature of the compressed combustion air 58 exiting the first turbocharger 92 is about 130 degrees centigrade.

The combustion air induction system 91 includes the second turbocharger 102. The second turbocharger 102 has a compressor section 112 having a compressor wheel 114 therein. The second turbocharger 102 has the turbine section 101 having a turbine wheel 118 being connected to a shaft 120. The shaft 120 is connected to the compressor wheel 114 in a conventional manner. The flow of exhaust gas 72 is communicated from the exhaust manifold 70 to the turbine section 101 in a conventional manner, such as by a pipe 122. The flow of compressed combustion air 58 from the outlet portion 108 of the first turbocharger 92 is communicated to an inlet portion 123 of the compressor section 112 in a conventional manner, such as by the pipe 124. The compressed combustion air 58 exits an outlet portion 126 of the compressor section 112 and is transferred to the intake manifold 57 in a conventional manner, such as by the pipe 104. The compressor section 112 of the second turbocharger 102 further pressurizes the compressed combustion air 58 from the first turbocharger 92 forming a second flow of combustion air at a second preestablished pressure ratio. In this application, the second preestablished pressure ratio of the combustion air is about 5 atmospheres or in this application about 4. atmospheres. And, the temperature of the compressed combustion air 58 exiting the second turbocharger 102 has a temperature of about 230 degrees centigrade. As an alternative, the first and/or the second preestablished pressure ratio of the first and/or the second turbochargers 92,102 can be varied without changing the gest of the disclosure. The physical relationship of the compressor section 94 of the first turbocharger 92 and the compressor section 112 of the second turbocharger 102 are in an efficient flow communication relationship. The less the flow restrictions, elbows, changes in cross section and turbulence, the more efficient the flow of combustion air 58. From the first turbocharger 92, the flow of exhaust gas 72 exits to atmosphere by way of a muffler 128. Thus, the first turbocharger 92 and the second turbocharger 102 have a separate compressor wheel.

Figure 5:
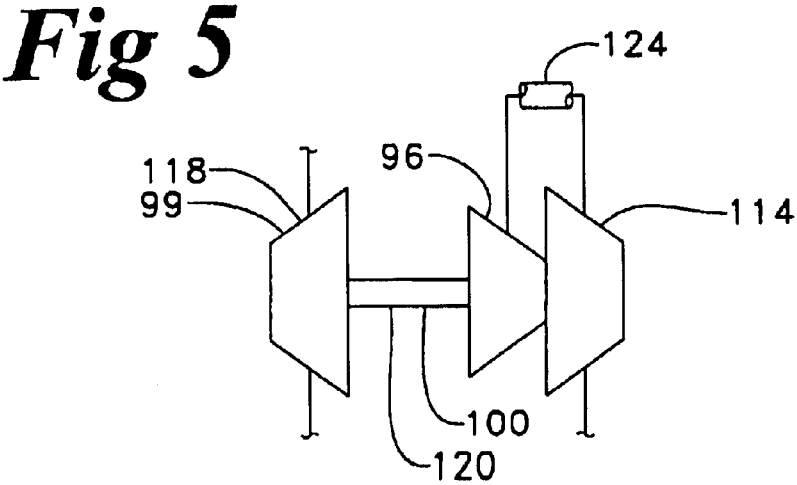
FIG. 5 is a schematic view of an alternate first and second turbocharger used with a combustion air cooling system.

As an alternative, best shown in FIG. 5, the first turbocharger 92 and the second turbocharger 102 can be combined into a singe turbocharger housing. For example, the turbine wheel 99,118 would be combine to form a single or common turbine wheel on a single shaft. The single shaft would drive the individual compressor wheel 96 and compressor wheel 114 within a common housing. Thus, forming a turbocharger having a dual compressor section.

The combustion air induction system 91 includes a combustion air cooling system 129. The combustion air cooling system 129 has a first aftercooler 130 positioned therein which may be attached to the engine 14. In this application, the first aftercooler 130 is attached to the engine 14 and is of an air-to-liquid type heat exchanger configuration. If looking toward a front of the engine 14, the first aftercooler 130 is positioned near the front lower left portion of the engine block 49. The first aftercooler 130 has a donor portion 132 in communication with the compressed combustion air 58 and a recipient portion 134 in communication with the coolant 18. The donor portion 132 has a combustion air inlet portion 136, a combustion air transfer portion 138 and a combustion air outlet portion 140. The recipient portion 134 has a liquid coolant inlet portion 142, a liquid coolant transfer portion 144 and a liquid coolant outlet portion 146. The combustion air inlet portion 136 is connected to the outlet portion 126 of the compressor section 112 of the second turbocharge 102 in a conventional manner such as by a pipe or a plurality of pipes 148. The combustion air inlet portion 136 of the first aftercooler 130 is position in line with the outlet portion 126 of the compressor section 112 of the second turbocharger 102. As an alternative, best shown in FIG. 5, the first aftercooler 130 could be interposed the first turbocharger 92 and the second turbocharger 102. With this alternative, the combustion air inlet portion 136 would be connected to the outlet portion 108 of the compressor section 94 of first turbocharger 92 and the combustion air outlet portion 140 of the first aftercooler 130 would be connected to the inlet portion 123 of the compressor section 112 of the second turbocharger 102. Compressed combustion air 58 entering the inlet portion 136 of the first aftercooler is at about 230 degrees centigrade and the compressed combustion air 58 exiting the first aftercooler is at about 170 degrees centigrade. The liquid coolant inlet portion 142 is connected to the coolant pump outlet portion 87 of the coolant pump 86. And, a second flow 18B of the total coolant 18 is formed by the coolant pump 86 and the first aftercooler 130. As an alternative, the liquid coolant 18 could be from a second source and not be identical to the liquid coolant 18 used to cool the engine 14.

The combustion air induction system 91 has a second aftercooler 160 positioned therein which, in this application, is positioned in front and/or aligned and above the heat exchanger 20 and the engine 14, and is attached to the chassis 12 in a conventional manner. In this application the second aftercooler 160 is of an air-to-air type heat exchanger configuration. The second aftercooler 160 has a donor portion 162 in communication with the compressed combustion air 58 and a recipient portion 164 in communication with the atmospheric air 24. The donor portion 162 has a combustion air inlet portion 166, a combustion air transfer portion 168 and a combustion air outlet portion 170. The recipient portion 164 has an atmospheric air inlet portion 172, an atmospheric air transfer portion 174 and an atmospheric air outlet portion 176. The combustion air inlet portion 166 is connected to the outlet portion 140 of the donor portion 132 of the first aftercooler 130 in a conventional manner such as by a pipe or a plurality of pipes 178. The atmospheric air inlet portion 172 is in communication with the atmospheric air 24 above the heat exchanger 20. As an alternative, the second aftercooler could be positioned at a position other than being above and in front and/or aligned with the heat exchanger 20 and the engine 14 without changing the gest of the system. However, it is contemplated that the atmospheric air passing through the second aftercooler 160 will be at too high a temperature to adequately cool the heat exchanger 20 to an adequate temperature for cooling the engine 14. With the alternative of above, with the first aftercooler 130 interposed the first turbocharger 92 and the second turbocharger 102, the combustion air inlet portion 166 would be connected to the outlet portion 126 of the compressor section 112 of the second turbocharger 102. And, the combustion air outlet portion 170 would be connected to the intake manifold 57 of the engine 14. The compressed combustion air 58 exiting the combustion outlet portion 170 of the second aftercooler 160 forming a third flow of combustion air having a temperature being about 49 degrees centigrade on a day having a temperature of about 25 degrees centigrade.

Figure 6:
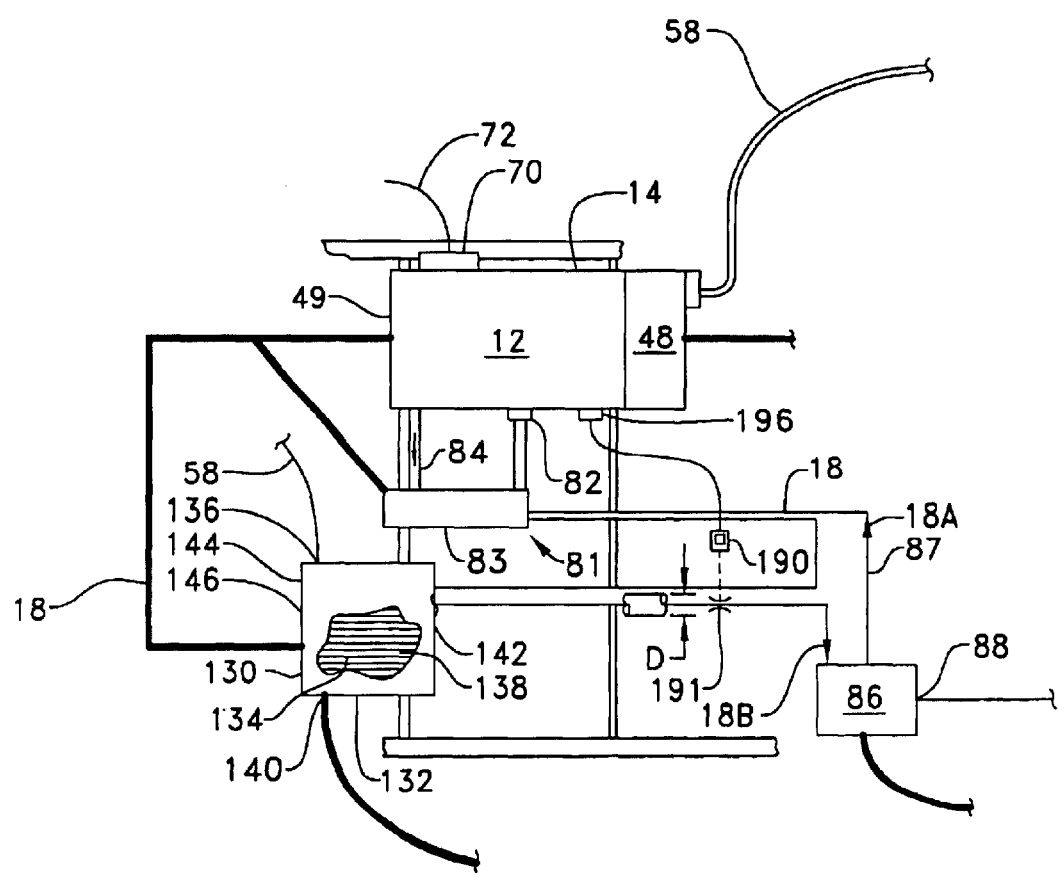
FIG. 6 is a schematic view of an alternate flow control valve used with a combustion air cooling system.

The combustion air cooling system 129 includes a flow control mechanism 190, such as a valve. As an alternative, best shown in FIG. 6, the flow control mechanism 190 could be an orifice 191 or a pipe or tube having a preestablished flow therethrough and/or cross sectional area designated as D. The flow control mechanism 190 is positioned near the coolant pump outlet portion 87. The flow control mechanism 190, in this application, is independent of the coolant pump 86. However, as an alternative, the flow control mechanism 190 could be formed as an integral portion of the coolant pump 86 without changing the essence of the system. The flow control mechanism 190, if the valve as shown in FIG. 1, is operational between a closed position 192 and an open position 194, shown in phantom. The flow control valve 190 is infinitely variable between the closed position 192 and the open position 194. As an alternative, the flow control mechanism 190 could be variable between the closed position 192 and the open position 194 is a series of fixed positions without changing the essence of the system. The flow control mechanism 190 is operatively moved between the closed position 192 and the open position 194 by a controller 196. The controller 196 senses engine parameters and/or atmospheric condition and depending on a set of fixed preestablished parameters positions the flow control valve 190 between the closed position 192 and the open position 194. Some of the parameters sensed and used by the controller 196 are the temperature and atmospheric pressure of the atmospheric air 24, the compressed combustion air 58 temperature and pressure, and the coolant 18 temperature. Other parameters, such as other pressures, engine load etc., can be used to control the position of the flow control mechanism 190.

Industrial Applicability

In the application example below, the air induction system 91 and the combustion air cooling system 129 is used with the engine 14 in an on-highway truck. The engine 14 is started. Combustion of pressurized combustion air 58 and fuel 54 takes place and exhaust 72 occurs. For example, on a day where the atmospheric air 24 is at a temperature of about 25 degrees centigrade, atmospheric air 24 enters the filter 105 and is cleansed before entering pipe 107 and passing to the compressor section 94 of the first turbocharger 92. The compressor wheel 96 compresses the atmospheric air 24 to the first preestablished pressure and temperature, about 2.4 atmospheres and about 130 degrees centigrade.

The pressurized combustion air 58 from the compressor section 94 enters the compressor section 112 of the second turbocharger 102. The compressor wheel 114 compresses the first preestablished pressure and temperature to the second preestablished pressurized and temperature, about 4.5 atmospheres and about 230 degrees centigrade. From the second turbocharger 102 the pressurized combustion air 58 passes through the plurality of pipes 148 to the first aftercooler 130. Within the first aftercooler 130 the pressurized combustion air 58 acts as the donor fluid, enters the inlet portion 136, passes into the transfer portion 138 and donates a portion of its heat to the recipient fluid, liquid coolant 18. After donating a portion of its heat to the liquid coolant 18, the pressurized combustion air 58 exits the outlet portion 140 at a temperature of about 170 degrees centigrade. The partially cooled pressurized combustion air 58 passes through the plurality of pipes 178 and enters the second aftercooler 160. The pressurized combustion air 58 enters the combustion air inlet portion 166 and passes into the combustion air transfer portion 168 and donates another portion of its heat to the recipient fluid, atmospheric air 24. After donating another portion of its heat to the atmospheric air 24, the pressurized combustion air 58 exits the combustion air outlet portion 170 at a temperature of about 49 degrees centigrade and enters the pipe 104 leading to the intake manifold 56.

From the intake manifold 56, the pressurized combustion air 58 flows in a generally conventional fashion within the engine 14. For example in the normal four cycle engine 14 operation, the intake valve mechanism 62 is positioned in the open position 64 before top dead center (TDC) during the exhaust stroke and remains in the open position 64 during the intake stroke to about bottom dead center (BDC). However, with the engine 14 operated with the Miller cycle, the intake valve mechanism 62 is positioned in the open position 64 before top dead center (TDC) in the exhaust stroke and remains in the open position 64 past bottom dead center (BDC) and into the compression stroke from about 150 degrees to about 60 before top dead center (BTDC) depending on the speed of the engine 14. As the piston assembly 52 travel from the top dead center position (0–180 degrees) pressurized combustion air 58 passes through the passage 60 and with the intake valve mechanism 62 in the open position 64 into the cylinder bore 51. With the pressurized combustion air 58 being at a pressure of about 4.5 atmospheres, the pressurized combustion air 58 pushes the piston assembly 52 adding energy to rotate the crankshaft 50. Thus, increasing the efficiency of the engine 14. At bottom dead center (BDC) the pressure of the intake manifold 57 and the cylinder bore 51 are about equal. As the piston assembly 52 begins to move up, toward top dead center (TDC), flow continues because of the momentum of the flow 58. However, the flow 58 eventually reverses back into the intake manifold 57 as the intake valve mechanism 62 is held in the open position 64 further into the compression stroke.

If the air induction system 91 and the combustion air cooling system 129 are used with a convention engine cycle, not the Miller cycle, the highly compressed combustion air 58 enters the intake manifold 56. And, with the intake valve mechanism 62 in the open position 64, the compressed combustion air 58 passes through the passage 60 into the cylinder bore 51. And, with the highly pressurized combustion air 58 the efficiency derived from the force of pushing on the piston assembly 52 is still attained. And, with the highly pressurized combustion air 58 a greater quantity of combustion air 58 is availabe to mix with fuel 54. Thus, a leaner burning, lower emission and more efficient engine is obtained.

The exhaust 72 from the combustion process, during the exhaust stroke, exits the cylinder bore 51 with the exhaust valve mechanism 76 in the open position 78. The exhaust 72 passes through the passage 74 and enters the exhaust manifold 70. From the exhaust manifold 70, the exhaust 72 enters the turbine section 101 driving the turbine wheel 118 and the shaft 120 causing the compressor wheel 114 to pressurize the combustion air 58 to the second preestablished pressure and temperature. From the turbine section 101 of the second turbocharger 102, the partially spent exhaust 72 passes through the pipe 103 and enters the turbine section 98 of the first turbocharger 92. The exhaust 72 drives the turbine wheel 99 and the shaft 100 causing the compressor wheel 96 to pressurize the combustion air 58 to the first preestablished pressure and temperature. As state earlier, if two turbine wheel 99,118 are combined into a single turbine wheel, and the two shafts 100,120 are combined and each of the compressor wheels 96 and 114 are positioned on the single shaft the exhaust 72 will drive the single turbine wheel.

The engine cooling system 16 has atmospheric air 24 flowing through the radiator 20. The fan 22, when rotating, draws atmospheric air 24 through the radiator 20. With the vehicle traveling down the open road, the velocity of the vehicle 10 causes atmospheric air 24 to pass through the radiator 20. The atmospheric air 24 acts as the recipient fluid to cool the donor fluid, liquid coolant 18. The coolant pump 86 is driven by the engine 14 and causes a flow of liquid coolant 18 to exit the coolant pump outlet portion 87 an passes through the plurality of cooling passages 53 in the block 49 absorbing heat. With the thermostat 89 open, the liquid coolant 18 passes through the upper flex hose 42 and enters the liquid coolant inlet 40 of the radiator 20 and passes through the tubes of the tubes and fins 34. The fins of the tube and fins 34 transfer heat from the liquid coolant 18 to the atmospheric air 24. The cooled liquid 18 exits the liquid coolant outlet 36 and passes through the flex hose 38 to the coolant pump inlet portion 88 and is recirculated by the coolant pump 86.

The first aftercooler 130 of the combustion air cooling system 129 as stated above uses the same liquid coolant 18 as does the engine cooling system 16. The liquid coolant 18 is circulated by the coolant pump 86. A portion of the flow of liquid coolant 18 exiting the coolant outlet portion 87 is circulated to the liquid coolant inlet portion 142 of the first aftercooler 130. The liquid coolant 18 acts as the recipient fluid and in the liquid coolant transfer portion 144 and heat is absorbed from the pressurized combustion air 58. The heated liquid coolant 18 exits the liquid coolant outlet portion 146 and is circulated to the coolant outlet portion 85 of the oil cooler 83. Within the coolant outlet portion 85 of the oil cooler 83 the liquid coolant 18 is mixed with the liquid coolant 18 used to cooling the engine 14 and passes through the plurality of cooling passages 53 in the engine 14. The mixed liquid coolant 18 passes through the engine 14 to the thermostat housing 90. The coolant outlet portion 87 of the coolant pump 86 acts to divide the liquid coolant into the first flow 18A, between the engine 14 and the heat exchanger or radiator 20 by the coolant pump 86, and a second flow 18B, between the first aftercooler 130 and the engine 14 by the coolant pump 86. By separating the coolant flow 18 into the first flow 18A and the second flow 18B, the flow of coolant 18 through the radiator 20 of the engine cooling system 16 is maintained at a level which will resists erosion of the structure of the tubes of the tubes and fins 34. To compensate for the greater cooling requirement of the radiator 20, a thicker core, wider tubes and fins 34 will be used verses that used today in an equivalent engine cooling system 16. As mentioned earlier, several alternatives are contemplated for dividing the flow of liquid coolant into the first flow 18A and the second flow 18B. Another version will use the flow control valve 190. The positioning of the flow control valve 190 between the closed position 192 and the open position 194 will vary the flow rate between the first flow 18A and the second flow 18B. Several methods are contemplated for varying the position of the control valve 190 between the closed position and the open position. For example, the controller 196 will have input from the engine 14 operation. Such parameters could be coolant 18 temperature, pressurized combustion air 58 temperature and atmospheric air 24 temperature. Other parameters could be atmospheric pressure, vehicle speed or air flow through the radiator 20. An orifice or preestablished cross sectional area of the liquid coolant inlet portion 142 could also be used to established the flow rate of the first flow 18A and the second flow 18B.

The second aftercooler 160 of the combustion air cooling system 129 uses the air-to-air configuration. The pressurized combustion air 58 is the donor fluid and atmospheric air 24 is the recipient fluid. With the second aftercooler 160 placed above the radiator 20 fresh unspent atmospheric air 24 is used. The unspent atmospheric air 24 enter the atmospheric air inlet portion 172, passes through the atmospheric air transfer portion 174 and absorbs heat from the pressurized combustion air 58 and exits the atmospheric outlet portion 176. The spent atmospheric air 24 is dissipated to the atmosphere. The pressurized combustion air 58 enters the combustion air inlet portion 166, passes through the combustion air transfer portion 168 where a portion of the heat within the pressurized combustion air 58 is extracted by the atmospheric air 24 and passes through the combustion air outlet portion 170. The cooled pressurized combustion air 58 passes through the pipe 104 into the intake manifold 57. And, as discussed above, enters the cylinder bore 51.

Other aspects, objects and advantages of this combustion air cooling system 129 can be obtained from a study of the drawings, the disclosure and the appended claims.

As an alternative, the flow of combustion air passing from the outlet portion of the compressor section of the first turbocharger can pass to the combustion air inlet portion of the first aftercooler. The flow of combustion air then passes through the first aftercooler before entering the inlet portion of the compressor section of the second turbocharger.

What is claimed is:

1. A method of cooling combustion air for use with an engine, said engine having a block at least one cylinder bore being positioned in said block and having a piston assembly operatively positioned therein, a plurality of cooling passages position in the block, an intake manifold and an exhaust manifold; said method of cooling comprising:

providing an engine cooling system, said engine cooling system having a heat exchanger being of a liquid-to-air type heat exchanger;

providing a first liquid flow of liquid coolant being a portion of a total flow through said heat exchanger and said engine;

compressing a flow of combustion air to a first preestablished pressure and a first preestablished temperature;

compressing said flow of combustion air to a second preestablished pressure and a second preestablished temperature;

cooling said flow of combustion air to a first temperature using a second liquid flow being the remainder of said total flow of said liquid coolant through a first aftercooler having a recipient fluid being said flow of liquid coolant through said engine;

providing a flow control valve varying a flow rate between said first liquid flow and said second liquid flow; and cooling said flow of combustion air to a second temperature using a second aftercooler having a recipient fluid being an atmospheric air.

2. The method of cooling combustion air of claim 1 wherein said step of providing a flow of liquid coolant includes said flow of liquid coolant being an identical coolant for each of said engine and said first aftercooler.

3. The method of cooling combustion air of claim 1 wherein said steps of compressing a flow of combustion air to a first preestablished pressure and a first preestablished temperature include using a first turbocharger and said step of compressing said flow of combustion air to a second preestablished pressure and a second preestablished temperature includes using a second turbocharger.

4. The method of cooling combustion air of claim 1 wherein said step of providing an engine cooling system, said engine cooling system having a heat exchanger being of a liquid to an air type heat exchanger having atmospheric air being a donor fluid.

5. A combustion air cooling system being used with an engine, said engine having a block including a plurality of cooling passages, at least a cylinder bore having a flow of combustion fluid and a flow of combustible fluid being supplied thereto, said combustion fluid and said combustible fluid combusting and forming an exhaust; said combustion air cooling system comprising:

an engine cooling system being in communication with said engine and including a heat exchanger being of a liquid-to-air type heat exchanger configuration and a liquid coolant pump, said liquid coolant pump defining a first flow of a liquid coolant, said first liquid flow circulating through said liquid coolant pump, said plurality of cooling passages in said block and said heat exchanger;

a first compressor section being attached to said engine and having an inlet portion and an outlet portion, said first compressor section compressing said combustion fluid to a first preestablished pressure and a first preestablished temperature;

a second compressor section being attached to said engine and having an inlet portion and an outlet portion, said inlet portion of said second compressor section being connected to said outlet portion of said first compressor section, said second compressor section compressing said combustion fluid to a second preestablished pressure and a second preestablished temperature;

a turbine section being attached to said engine and being driven by said exhaust from said at least one cylinder bore, said turbine section driving said first compressor section and said second compressor section by a shaft;

a first aftercooler being of an air-to-liquid type heat exchanger configuration being attached to said engine and having said combustion fluid flowing therethrough as said air and a portion of said liquid coolant flowing therethrough as said liquid prior to entering said engine, said first aftercooler having an inlet portion and an outlet portion and a liquid coolant inlet portion and a liquid coolant outlet portion;

a second aftercooler being of an air-to-air type heat exchanger configuration being in communication with said engine and having said combustion fluid flowing therethrough as one of said air and having an atmospheric air flowing therethrough as an other of said air, said second aftercooler having a combustion air inlet portion being connected to said outlet portion of said first aftercooler and a combustion air outlet portion being connected to said at least one cylinder bore;

a second liquid flow of said coolant, said liquid coolant pump defining said second liquid flow of said coolant, said second liquid flow of said coolant circulating through at least said liquid coolant pump and said first aftercooler; and a flow control valve varying a flow rate between said first liquid flow and said second liquid flow.

6. The combustion air cooling system of claim 5 wherein said second flow of said coolant circulating through said plurality of cooling passages in said block of said engine.

7. The combustion air cooling system of claim 5 wherein said first flow and said second flow of said coolant being mixed, said mixing being positioned at a coolant pump inlet portion.

8. The combustion air cooling system of claim 5 wherein said first flow and said second flow of said coolant being mixed, said mixing being positioned at a coolant pump outlet portion.

9. The combustion air cooling system of claim 5 wherein said engine including an oil cooler being attached to said engine and said first flow and said second flow of said coolant being mixed, said mixing being positioned at a coolant outlet portion of said oil cooler.

10. The combustion air cooling system of claim 5 wherein said engine including a thermostat being attached to said engine and first flow and said second flow of said coolant being mixed, said mixing being positioned at said thermostat.

11. The combustion air cooling system of claim 5 wherein said first flow and said second flow of said coolant being mixed and passing through said plurality of cooling passages in said block prior to being circulated through a heat exchanger.

12. The combustion air cooling system of claim 5 wherein said second flow of said coolant being controlled to a preestablished flow rate.

13. The combustion air cooling system of claim 12 wherein said preestablished flow rate being varied by said flow control valve being operative movable between a closed position and an open position.

14. The combustion air cooling system of claim 12 wherein said flow control valve being operative movable infinitely between said closed position and said open position.

15. The combustion air cooling system of claim 12 wherein preestablished flow rate being controlled by an orifice.

16. The combustion air cooling system of claim 12 wherein said preestablished flow rate of said second flow of said coolant being controlled by a preestablished cross sectional area through which said second flow passes.

17. The combustion air cooling system of claim 12 wherein said flow control valve being positioned between said closed position and said open position being positioned by a controller.

18. The combustion air cooling system of claim 17 wherein said controller monitoring at least one parameter of said engine.

19. The combustion air cooling system of claim 17 wherein said controller monitoring at least one parameter of said coolant.

20. The combustion air cooling system of claim 17 wherein said controller monitors at least one parameter of said compressed combustion air.

21. An engine has a block having at least one cylinder bore in which is operatively positioned a piston assembly, a plurality of cooling passages within said block, an intake manifold being in communication with said at least one cylinder bore by an intake valve mechanism, an exhaust manifold being in communication with said at least one cylinder bore by an exhaust valve mechanism and a cooling system having a heat exchanger being of a liquid-to-air type configuration being connected to said engine, said cooling system having a liquid coolant pump being driven by said engine and circulating a flow of liquid coolant within said plurality of cooling passages and said heat exchanger; said engine comprising:

a first turbocharger being connected to said engine, said first turbocharger having a turbine section being driven by a low of exhaust gas from a second turbocharger, a compressor section having an inlet portion and an outlet portion;

a first flow of combustion air exiting said outlet portion of said first turbocharger having a first pre-established pressure and a first pre-established temperature;

said second turbocharger being connected to said engine, said second turbocharger having a turbine section being drive by said flow of exhaust gas from said exhaust manifold, a compressor section having an inlet portion and an outlet portion;

a second flow of combustion air exiting said second turbocharger having a second pre-established pressure and a second pre-established temperature;

a first after-cooler being of an air-to-liquid type heat exchanger, said liquid within said first after-cooler being a second portion of a total flow of liquid coolant circulating through said plurality of passages in said block and the air within said first after-cooler being said flow of combustion air;

a flow control valve varying a flow rate between said second portion of a total flow of liquid coolant circulating through said first after-cooler and a first portion of the total flow circulating through said engine;

a second after-cooler being of an air-to-air type heat exchanger, a one of said air within said second after-cooler being atmospheric air and an other of said air within said second after-cooler being said flow of combustion air;

a third flow of combustion air after passing through said first turbocharger, said second turbocharger, said first after-cooler and said second after-cooler being communicated to said intake manifold; and a pre-established quantity of said third flow of combustion air being communicated to said at least one cylindrical bore by said intake valve mechanism moving between an open position and a close position.

22. The engine of claim 21 wherein said intake valve mechanism moving between an open position and a closed position using a Miller cycle.

23. The engine of claim 22 wherein said Miller cycle includes a late intake valve mechanism being in said open position within a range of about 150 degrees to 60 degrees before a bottom dead center position.

24. The engine of claim 21 wherein said first aftercooler being position to cool only said first flow of combustion air.

25. The engine of claim 21 wherein said second aftercooler being position to cool said second flow of combustion air after said first flow of combustion air being cooled by said first aftercooler.

26. The engine of claim 21 wherein said atmospheric air passing through said second aftercooler having passed through said heat exchanger before passing through said second aftercooler.

27. The engine of claim 21 being positioned in one of a work machine and a vehicle.

28. A combustion air cooling system for use with an engine, said engine has an exhaust manifold and an intake manifold, at least one cylinder bore having a piston assembly therein being movable between a top dead center position (TDC) and a bottom dead center position (BDC), at least one intake valve mechanism being movable between an open position and a closed position during operation of said engine, a flow of combustion air being communicated between said intake manifold an said at least one cylinder bore during said open position and said flow of combustion air being prevented from communicating between said intake manifold and said at least one cylinder bore during said closed position; said combustion air cooling system comprising:

an engine cooling system including a heat exchanger being of a liquid-to-air type heat exchanger configuration and a liquid coolant pump, said liquid coolant pump being attached to said engine and having a coolant pump outlet portion and a coolant pump inlet portion, said heat exchanger having a liquid coolant inlet and a liquid coolant outlet, said liquid coolant pump during operation of said engine causing a first liquid flow being a portion of a total flow to circulate through said engine and a second liquid flow being the remainder of the total flow to circulate through said heat exchanger, said engine cooling system having a flow of recipient fluid being an atmospheric air passing therethrough;

a flow control valve varying a flow rate between said first liquid flow and said second liquid flow;

a first turbocharger being positioned on said engine, said first turbocharger having a turbine section and during operation of said engine said turbine section being driven by a flow of exhaust gas exiting a second turbocharger, a compressor section being driven by said turbine section, said compressor section having an inlet portion and an outlet portion, said combustion air after passing from said inlet portion through said outlet portion having a first preestablished pressure;

said second turbocharger being position on said engine, said second turbocharger having a turbine section and during operation of said engine said turbine section being driven by said flow of exhaust gas exiting said exhaust manifold, a compressor section being driven by said turbine section, having an inlet portion and an outlet portion, said combustion air after passing through said outlet portion of said first turbocharger entering said inlet portion of said second turbocharger and passing through said outlet portion having a second preestablished pressure being greater than said first preestablished pressure exiting said first turbocharger;

a first aftercooler being of an air-to-liquid type heat exchanger configuration and having a recipient fluid therein, having a donor portion and a recipient portion being connected to said engine, said donor portion having a combustion air inlet portion, a combustion air transfer portion and a combustion air outlet portion, said recipient portion having a liquid coolant inlet portion, a liquid coolant transfer portion and a liquid coolant outlet portion, said first aftercooler having said liquid from said engine cooling system being said recipient fluid, said first aftercooler having said combustion air being said donor fluid and exiting said combustion air outlet portion of said first aftercooler at a first preestablished temperature; and a second aftercooler being of an air-to-air type heat exchanger configuration having a recipient fluid therein, having a donor portion and a recipient portion being connected to said engine, said donor portion having a combustion air inlet portion a combustion air transfer portion and a combustion air outlet portion, said recipient portion having an atmospheric air inlet portion, an atmospheric air transfer portion and an atmospheric air outlet portion, said second aftercooler having said atmospheric air being said recipient fluid, said second aftercooler having said combustion air being said donor fluid and exiting said combustion air outlet portion of said second aftercooler at a second preestablished temperature being less than said first preestablished temperature, said combustion air at said second preestablished pressure and said second preestablished temperature being communicated to said intake manifold and said at least one cylinder bore.

29. The combustion air cooling system of claim 28 wherein said flow of combustion air passing from said outlet portion of said compressor section of said first turbocharger to said inlet portion of said compressor section of said second turbocharger through said outlet portion of said second turbocharger before entering said combustion air inlet portion of said first aftercooler and said second aftercooler respectively.

30. The combustion air cooling system of claim 28 wherein said flow of combustion air passing from said outlet portion of said compressor section of said first turbocharger to said combustion air inlet portion of said first aftercooler through said combustion air outlet portion of said first aftercooler before entering said inlet portion of said compressor section of said second turbocharger.

31. The combustion air cooling system of claim 28 wherein said flow of exhaust gas entering said turbine section and driving said second turbocharger, exiting said turbine section and entering said turbine section of said first turbocharger driving said first turbocharger.

32. The combustion air cooling system of claim 28 wherein said turbine section of said first turbocharger and said turbine section of said second turbocharger having a common turbine wheel.

33. The combustion air cooling system of claim 32 wherein said compressor section of said first turbocharger and said compressor section of said second turbocharger each have a separate compressor wheel.

34. The combustion air cooling system of claim 33 wherein said separate compressor wheel being positioned on a common shaft.

35. The combustion air cooling system of claim 28 wherein said liquid coolant inlet portion of said first aftercooler being in fluid communication with said liquid coolant pump of said engine cooling system.

36. The combustion air cooling system of claim 35 wherein said liquid coolant outlet portion of said first aftercooler being in fluid communication with a recipient coolant outlet portion of an oil cooler of said engine.

37. The combustion air cooling system of claim 28 wherein said recipient fluid passing through said first aftercooler being recirculated is void of passing directly through said heat exchanger.

38. The combustion air cooling system of claim 37 wherein said recipient fluid passing through said first aftercooler being mixed with a flow of said coolant and being circulated through said engine prior to being circulated through said heat exchanger.

39. The combustion air cooling system of claim 38 wherein said mixing of said flow of recipient fluid and said flow said coolant being positioned at a coolant pump inlet portion of said coolant pump.

40. The combustion air cooling system of claim 38 wherein said mixing of said flow of recipient fluid and said flow of said coolant being position at a recipient coolant outlet portion of said oil cooler.

41. The combustion air cooling system of claim 38 wherein said mixing of said flow of recipient fluid and said flow of said coolant being positioned at a thermostat.

42. The combustion air cooling system of claim 28 wherein said flow control valve operating between a closed position and an open position.

43. The combustion air cooling system of claim 42 wherein said flow control valve being in said closed position preventing a flow of said recipient fluid through said first aftercooler.

44. The combustion air cooling system of claim 43 wherein said flow control valve being in said open position having said flow of said recipient fluid passing through said first aftercooler.

45. The combustion air cooling system of claim 43 wherein said controller monitoring at least one parameter of said engine.

46. The combustion air cooling system of claim 43 wherein said controller monitoring at least one parameter of said coolant.

47. The combustion air cooling system of claim 43 wherein said controller monitoring at least one parameter of said compressed combustion air.

48. The combustion air cooling system of claim 42 wherein said flow control valve being positioned between said closed position and said open position being positioned by a controller.

49. The combustion air cooling system of claim 28 wherein said heat exchanger having a pair of side tanks and a plurality of tubes and fins therebetween.

* * * * *

UNITED STATES PATENT AND TRADEMARK OFFICE
CERTIFICATE OF CORRECTION

PATENT NO. : 6,883,314 B2
APPLICATION NO. : 10/210273
DATED : April 26, 2005
INVENTOR(S) : James J. Callas et al.

It is certified that error appears in the above-identified patent and that said Letters Patent is hereby corrected as shown below:

column 4, line 10, "gest" has been changed to --gist--;
column 4, line 14, "inlet" has been changed to --outlet--;
column 11, line 2, "a" has been changed to --the first--;
column 13, line 6, "low" has been changed to --flow--;
column 13, line 14, "drive" has been changed to --driven--;
column 13, line 31, "a one of said" has been changed to --one flow of--;
column 13, line 32, "an other of said" has been changed to --another flow of--;
column 13, line 40, "cylindrical" has been changed to --cylinder--;
column 13, line 42, "close" has been changed to --closed--;
column 13, line 49, "bottom" has been changed to --top--;
column 13, line 50, "aftercooler" has been changed to --after-cooler--;
column 13, line 51, "position" has been changed to --positioned--;
column 13, line 53, "position" has been changed to --positioned--;
column 13, line 55, "aftercooler" has been changed to --after-cooler--;
column 13, line 57, "aftercooler" has been changed to --after-cooler--;
column 13, line 58, after "said," (first occurrence) --air-to-liquid type-- has been inserted;
column 13, line 59, "aftercooler" has been changed to --after-cooler--.

Signed and Sealed this

Thirtieth Day of September, 2008

JON W. DUDAS
*Director of the United States Patent and Trademark Office*